United States Patent
Slagel (10) Patent No.: US 8,015,754 B2
(45) Date of Patent: *Sep. 13, 2011

(54) CONTAINERIZED ACCESS CONTROL UNIT

(75) Inventor: Robert Rhett Slagel, Ironton, OH (US)

(73) Assignee: Modular Security Systems, Inc., Ironton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/818,899

(22) Filed: Jun. 18, 2010

(65) Prior Publication Data

US 2010/0315199 A1 Dec. 16, 2010

Related U.S. Application Data

(63) Continuation of application No. 10/992,126, filed on Nov. 19, 2004, now Pat. No. 7,762,025.

(51) Int. Cl.
*E04H 1/00* (2006.01)
(52) U.S. Cl. .............................. 52/79.1; 52/174; 52/79.8
(58) Field of Classification Search ................... 52/79.1, 52/174, 33, 79.8, 106, 79.7
See application file for complete search history.

(56) References Cited

U.S. PATENT DOCUMENTS

| | | | |
|---|---|---|---|
| 3,482,037 A | 12/1969 | Brown et al. |
| 3,492,767 A | 2/1970 | Pincus |
| 4,308,803 A | 1/1982 | Pretini |
| 4,385,469 A | 5/1983 | Scheuerpflug et al. |
| 4,481,887 A | 11/1984 | Urbano |
| 4,513,545 A | 4/1985 | Hopkins, Jr. |
| 4,586,441 A | 5/1986 | Zekich |
| 4,656,954 A | 4/1987 | Tonali |
| 4,683,688 A | 8/1987 | Wojcinski |
| 5,353,558 A | 10/1994 | Shea, Sr. et al. |
| 5,542,211 A * | 8/1996 | Colombo ......................... 49/42 |
| 5,579,613 A | 12/1996 | Carr |
| 5,617,674 A | 4/1997 | Terrill |
| 5,676,271 A | 10/1997 | Reynard |
| 5,704,163 A | 1/1998 | Kocznar |
| 5,706,614 A | 1/1998 | Wiley et al. |
| 5,727,352 A | 3/1998 | Bared et al. |
| 5,735,639 A | 4/1998 | Payne et al. |
| 5,983,578 A | 11/1999 | Huttie et al. |
| 6,102,228 A | 8/2000 | Rene |
| 6,155,747 A | 12/2000 | Payne et al. |
| 6,170,194 B1 | 1/2001 | Kocznar |
| 6,205,200 B1 | 3/2001 | Boyer et al. |

(Continued)

FOREIGN PATENT DOCUMENTS

BE 1009435 3/1997

(Continued)

OTHER PUBLICATIONS

U.S. Appl. No. 11/733,464, filed Apr. 1, 2007, Slagel.

(Continued)

*Primary Examiner* — Basil Katcheves
(74) *Attorney, Agent, or Firm* — DLA Piper LLP US (57) ABSTRACT

A portable container is provided which comprises a passing room(s) allowing entry into a second area into a first area, the passing room having at least two openings with a walkway in-between. Barrier device(s) can be located in the walkway but not connected to the first or second opening. A control room(s) can also be provided, the control room being connected to the passing room(s).

36 Claims, 5 Drawing Sheets

U.S. PATENT DOCUMENTS

| | | | |
|---|---|---|---|
| 6,299,008 B1 | 10/2001 | Payne | |
| 6,513,670 B2 | 2/2003 | Minkkinen | |
| 6,610,977 B2 * | 8/2003 | Megerle | 250/287 |
| 6,724,304 B2 | 4/2004 | Risi | |
| 6,742,301 B1 | 6/2004 | Schwarz | |
| 6,745,520 B2 | 6/2004 | Puskaric et al. | |
| 6,929,175 B2 | 8/2005 | Stockhammer | |
| 6,972,693 B2 | 12/2005 | Brown et al. | |
| 6,973,758 B2 | 12/2005 | Zeik | |
| 6,983,567 B2 | 1/2006 | Ciotti | |
| 7,023,339 B2 | 4/2006 | Stomski | |
| 7,102,512 B2 | 9/2006 | Pendergraft | |
| 7,119,682 B1 | 10/2006 | Fisher | |
| 7,762,025 B2 * | 7/2010 | Slagel | 52/79.1 |
| 2004/0232054 A1 | 11/2004 | Brown et al. | |
| 2005/0074086 A1 | 4/2005 | Pendergraft | |
| 2006/0107614 A1 | 5/2006 | Slagel | |
| 2006/0150872 A1 | 7/2006 | Mesinger | |
| 2008/0250726 A1 | 10/2008 | Slagel et al. | |

FOREIGN PATENT DOCUMENTS

| | | |
|---|---|---|
| CA | 2 303 611 | 10/2000 |
| DE | 203 16 067 | 4/2004 |
| DE | 10 2004 048 403 | 4/2006 |
| DE | 20 2008 002 754 | 8/2008 |
| EP | 0 008 271 | 2/1980 |
| EP | 0 143 494 | 6/1985 |
| EP | 0 940 775 | 9/1999 |
| EP | 1 557 527 | 7/2005 |
| ES | 2 049 596 | 4/1994 |
| ES | 2 068 052 | 4/1995 |
| FR | 2 489 404 | 3/1982 |
| FR | 2 646 456 | 11/1990 |
| FR | 2 808 048 | 10/2001 |
| GB | 2 041 053 | 9/1980 |
| GB | 1 589 510 | 5/1981 |
| GB | 1 600 858 | 10/1981 |
| GB | 2 146 053 | 4/1985 |
| GB | 2 249 574 | 5/1992 |
| GB | 2 264 470 | 9/1993 |
| GB | 2 408 127 | 5/2005 |
| GB | 2 440 937 | 2/2008 |
| NL | 7 308 642 | 12/1974 |
| NL | 9301809 | 5/1995 |
| RU | 2 247 821 | 12/2003 |
| WO | WO 94/05879 | 3/1994 |
| WO | WO 96/30601 | 10/1996 |
| WO | WO 00/78129 | 12/2000 |
| WO | WO 2006/055078 | 5/2006 |

OTHER PUBLICATIONS www.smithsdetection.com; press release "Smiths Detection unveils innovative mobile security checkpoint for screening individuals and personal items"; Wiesbaden, Germany, Mar. 2, 2005.

www.smithsdetection.com; press release "Smiths Detection Creates First Mobile Security Screening Checkpoint in Partnership With TSWG and TSA Pine Brook, N.J.", Pine Brook, N.J., Apr. 3, 2006.

www.wolfcoach.com; "Mobile Perimeter Checkpoint" brochure from L3 Communications (Wolf Coach) company's website; Apr. 2007.

www.miframsecurity.com/e/check_post.html; "Protected Screening Module" from Mifram Security Company's website, Apr. 7, 2005.

http://web.archive.org/web/*hh_/www.miframsecurity.com/e/check_post.asp; "Way Back Machine"; an internet archive.

Employees' Compensation Case No. 699 of 2005, in the District Court of the Hong Kong Special Administrative Region, Oct. 5, 2006.

www.ascontainers.co.za/services.htm; A.S. Containers cc., 2007.

Brijot Imaging Systems, Inc., press release "Brijot Delivers First ScanPort™ Production Order to U.S. Army for Deployment in Middle East"; Orlando, Fla., May 20, 2008.

International Search Report issued in Application No. PCT/US08/056503 mailed Jul. 15, 2008.

Written Opinion issued in Application No, PCT/US08/056503 mailed Jul. 15, 2008.

English language translation of NL 9 301 809, published May 16, 1995.

English language abstract of ES 2 068 052, published Apr. 1 1995.

English language abstract of ES 2 049 596, published Apr. 16, 1994.

English language abstract of DE 10 2004 048 403, published Apr. 6, 2006.

English language abstract of FR 2 489 404, published Mar. 5, 1982.

English language abstract of RU 2 247 821, published Dec. 10, 2003.

English language abstract of EP 0 940 775, published Sep. 8, 1999.

English language abstract of FR 2 646 456, published Nov. 2, 1990.

English language abstract of DE 203 16 067, published Apr. 1, 2004.

English language abstract of FR 2 808 048, published Oct. 26, 2001.

English language abstract of BE 1 009 435, published Mar. 4, 1997.

Letter dated Dec. 16, 2008, from Haseltine Lake, including analysis of current claim of counterpart EP 1 812 666.

English language abstract of EP 1557527, published Jul. 27, 2005.

English language abstract of EP 0008271, published Feb. 20, 1980.

International Preliminary Report, on Patentability (IPRP) issued in PCT/US2008/056503 on Oct. 22, 2009.

USPTO Image File Wrapper of relate U.S. Appl. No. 10/992,126 captured May 19, 2010.

USPTO Image File Wrapper of relate U.S. Appl. No. 11/733,464 captured Jun. 17, 2010.

USPTO Image File Wrapper of relate U.S. Appl. No. 10/992,126 captured from Jun. 19, 2010 to May 4, 2011.

USPTO Image File Wrapper of relate U.S. Appl. No. 11/733,464 captured from Jun. 19, 2010 to May 4, 2011.

USPTO Image File Wrapper of relate U.S. Appl. No. 12/889,861 captured on May 4, 2011.

ISO Standards Handbook, Freight Containers, fourth edition 2006.

* cited by examiner

CONTAINERIZED ACCESS CONTROL UNIT

CROSS-REFERENCE TO RELATED APPLICATIONS

This application is a continuation of U.S. application Ser. No. 10/992,126 filed Nov. 19, 2004. The entire contents of all of the application mentioned above are incorporated herein by reference.

FIELD OF THE INVENTION

The present invention is directed generally to access control systems and specifically to portable access control systems.

DESCRIPTION OF EMBODIMENTS OF THE INVENTION

The Containerized Access Control Unit

Figure 1:
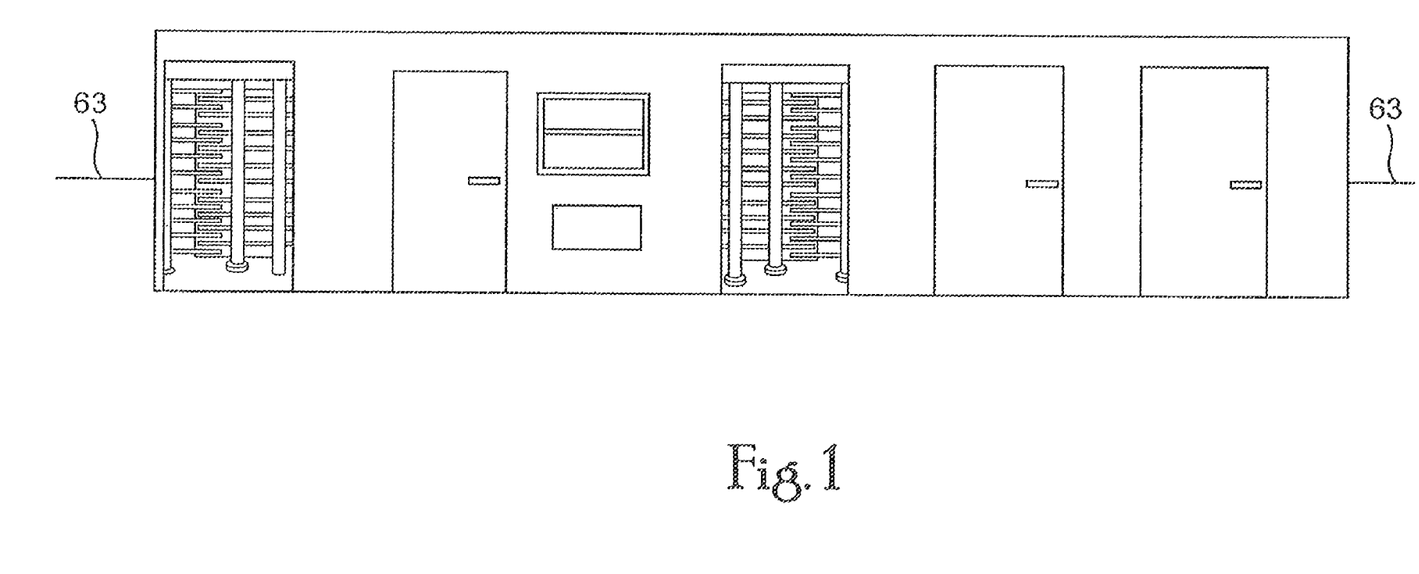
FIGS. 1 and 2 illustrate a front view and a perspective view of a portable container 110, according to embodiments of the invention.
Figure 2:
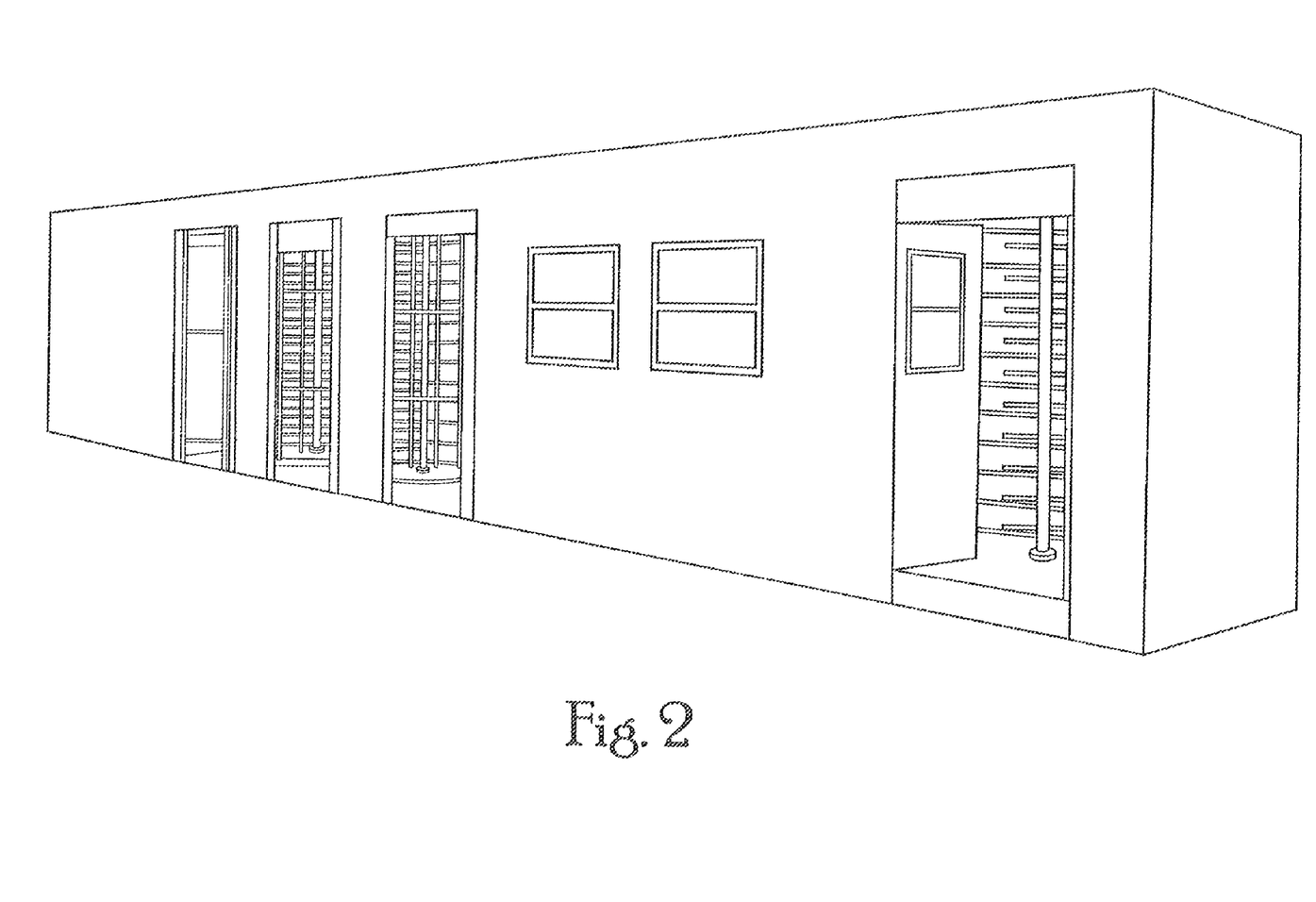

FIGS. 1 and 2 illustrate a front view and a perspective view of a portable container 110, according to embodiments of the invention. The portable container 110 has housing 20, which, in one embodiment, is rectangular shaped. However, any other shape is also possible. The housing 20 can be made of a durable material (e.g., iron, stainless steel), enabling the portable container 110 to be securely towed by a vehicle. One or both ends of the portable container 110 can be equipped to be towed by a vehicle. In addition, a security system to ensure that only authorized vehicles move the portable container 110 can also be included. Furthermore, fencing 63 or other material may be attached to the portable container 110 to surround a secured area 62 (e.g., see FIG. 5).

Figure 3:
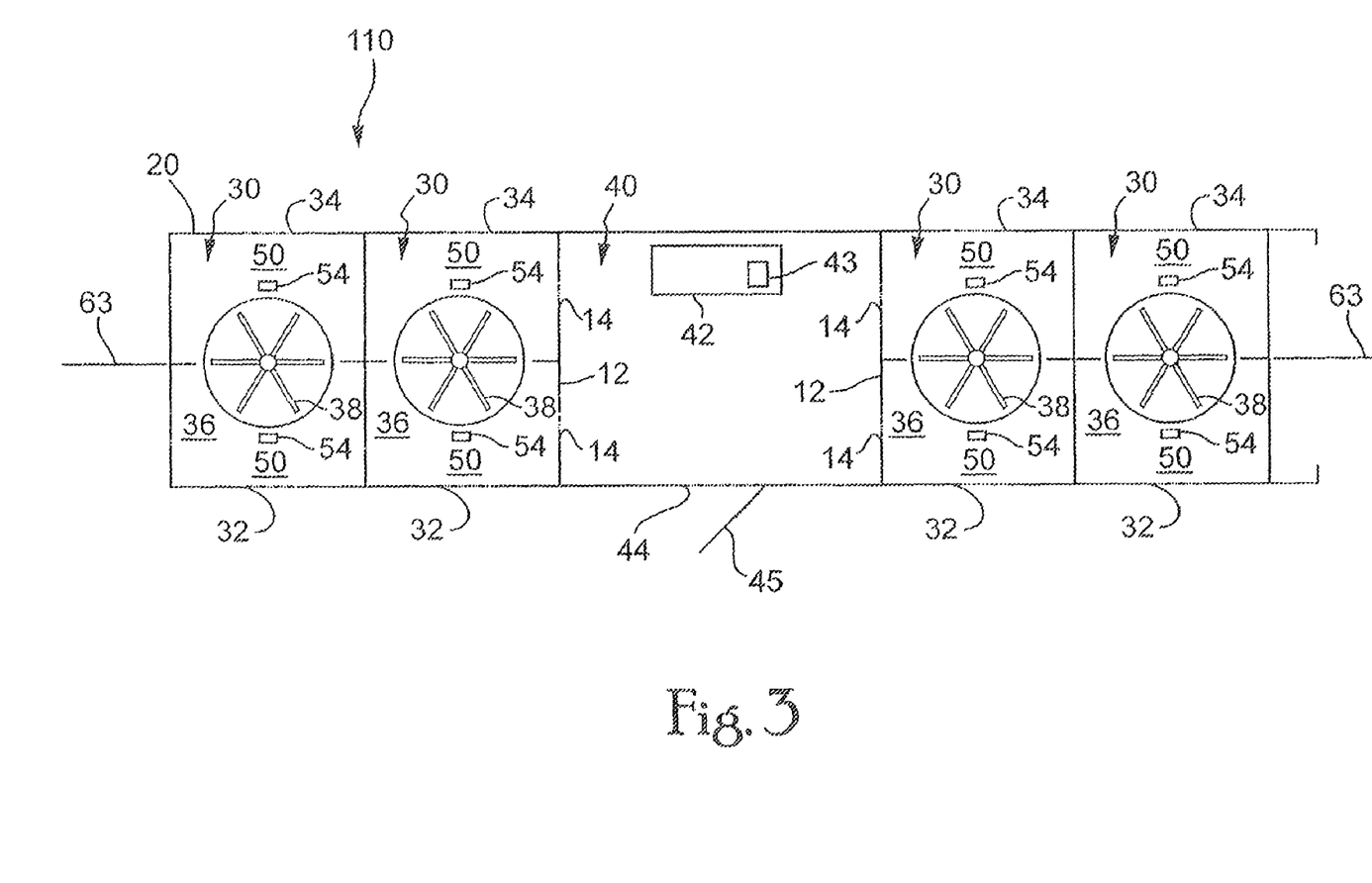
FIG. 3 illustrates a top cross-sectional view of the portable container 110, according to one embodiment of the invention.

FIG. 3 illustrates a top cross-sectional view of the portable container 110, according to one embodiment of the invention. The portable container 110 comprises at least one passing room 30, which is provided for controlling and directing the movement of people between two areas. In addition, the portable container 110 can also comprise at least one control room 40, for housing a guard or supervisor.

The portable container 110 can be a standard shipping container. In one embodiment, the standard shipping container can be a shipping container which complies with international standards as determined by the International Organization for Standardization (ISO). In one embodiment, the shipping container can include the following features: made from corrugated steel; heavy steel framed to withstand repeated lifting and placing; able to hold a cargo as large as 30 tons; marine grade plywood flooring; lockable accessible doors on one or both sides of the shipping container; forklift pockets; corner connectors; or a venting system; or any combination thereof.

In one embodiment, the portable container 110 can be delivered to a user in a ready-made or turn-key state. In this case, if electricity is not required, the portable container 110 is ready to be used. If electricity is required, all that needs to be done to render the portable container 110 usable is the provision of electricity. In another embodiment, the portable container can be customized by the user to meet specific needs of the user.

Figure 4:
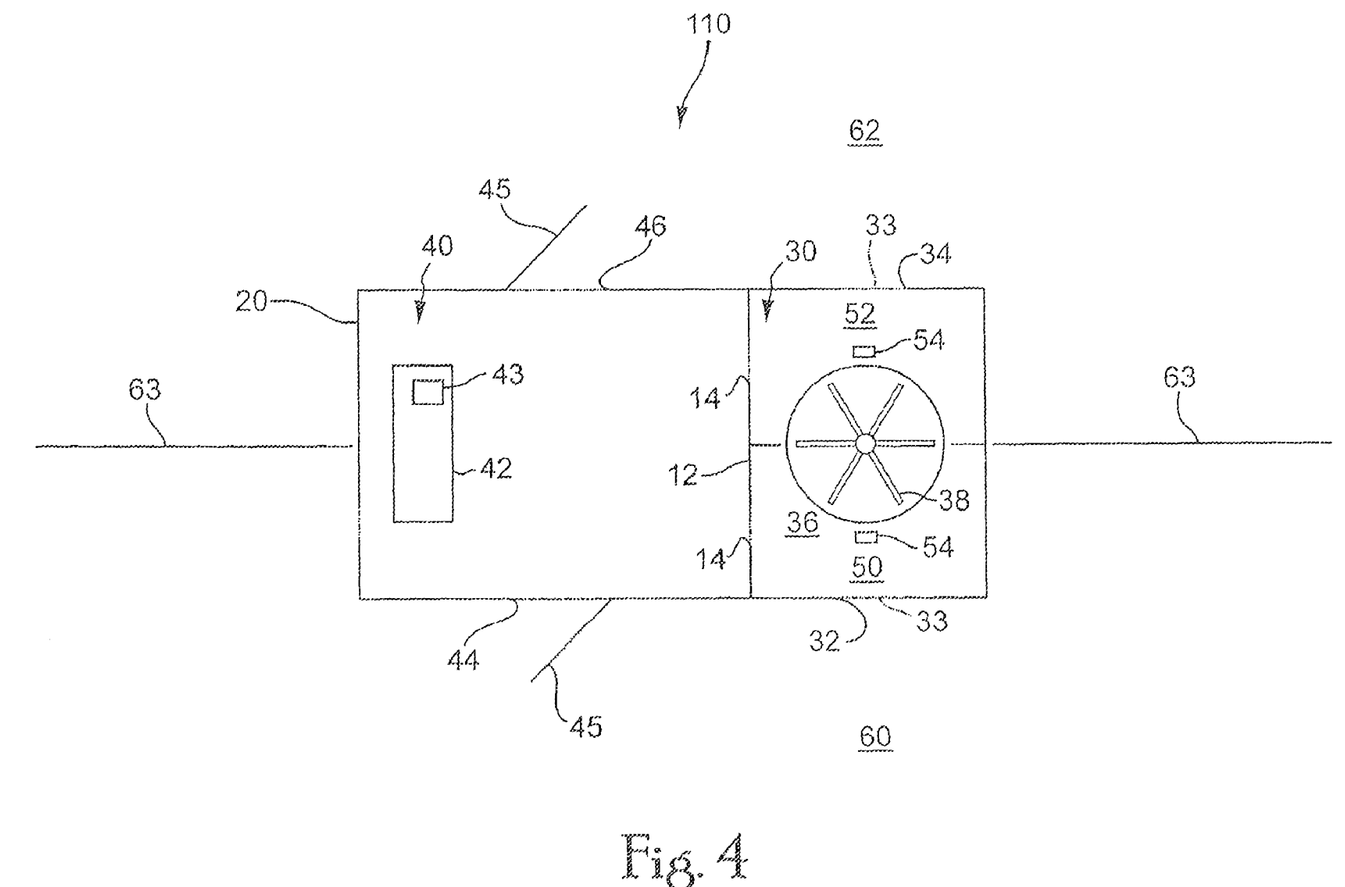
FIG. 4 is a detailed top cross-sectional view of a passing room 30 and a control room 40, according to one embodiment of the invention.

FIG. 4 is a detailed top cross-sectional view of a passing room 30 and a control room 40, according to one embodiment of the invention.

Passing Room. The passing room 30 controls the movement of people between area 60 and another area 62. A fence 63 can also be used to separate areas 60 and 62 in locations where the portable containers 110 are not used. The passing room 30 has at least a first opening 32, and at least a second opening 34, which in one embodiment is on a side opposite the first opening 32. However, the first opening 32, second opening 34, and additional openings can be located on any side of the passing room 30, including being located on the same side of the passing room 30. The second opening 34 is spaced apart from the first opening 32 so as to define a walkway 36 in-between. A closing device 33 (e.g., a door, shutters) is employed to close the openings 32 and 34 when passing room 30 is not in use. A security sensing device for safeguarding the closing device 33 can be employed.

The portable container 110 can comprise at least one barrier device 38 in the inside of the passing room 30, which restricts a person's movement through the passing room 30. In one embodiment, a turnstile (e.g., a full-body turnstile, a partial-body turnstile, a bi-directional turnstile, or a uni-directional turnstile) is employed as a barrier device of the portable container 110, but other barrier device may be used to restrict a person's movement through the passing room 30. For example, a sliding door, a revolving door, moving bars, and gates may be used as a barrier device. The barrier device 38 is located inside the walkway 36, defining a first space 50 between the barrier device 38 and the first opening 32, and defining a second space 52 between the barrier device 38 and the second opening 34.

In one embodiment, the passing room 30 can alternatively include at least one security device 54 issuing permission for a person to pass through the passing room 30. In one embodiment, the security device 54 can comprise, but is not limited to, one or more card readers, metal detectors, biometric readers, iris scanners, fingerprint or palm readers, explosive detectors, physical or facial recognition technology, electronic key locks, or mechanical key locks, or any combination thereof. The security device 54 can also include a security measure, such as, but not limited to, posting an individual proximate to the barrier device 38 to check identification cards (e.g., photo identification cards, licenses). In one embodiment, a security device 54 is located in the first space 50 and also in the second space 52. Security devices 54 can be included inside or outside of the passing room.

The passing room 30 can also comprise lighting.

Control Room. In one embodiment, a control room 40 is provided for housing a guard or supervisor. The control room 40 can include a control panel 42 to control the barrier device(s) 38 and the security device(s) 54 in order for a guard or supervisor to monitor the passing room while staying in the control room 40. The control panel 42 can comprise an alarm device 43 which gives an alarm in case a problem occurs in the passing room 30.

The control room 40 and the passing room 30 are separated by at least one wall 12. The wall 12 can comprise at least one window 14, so that a guard in the control room 40 can observe the inside of the passing room 30 or the outside of the portable container 110. The control room 40 has at least one opening 44 with at least one closing device 45. The closing device(s) 45 of the control room 40 can be the same as, or different from, the closing device(s) 33 of the passing room 30.

The control room 40 can also comprise: heat and/or air-conditioning; lighting; at least one computer/cable outlet; at least one phone jack; at least one electrical outlet; at least one vent; or insulation; or any combination thereof.

Figure 5:
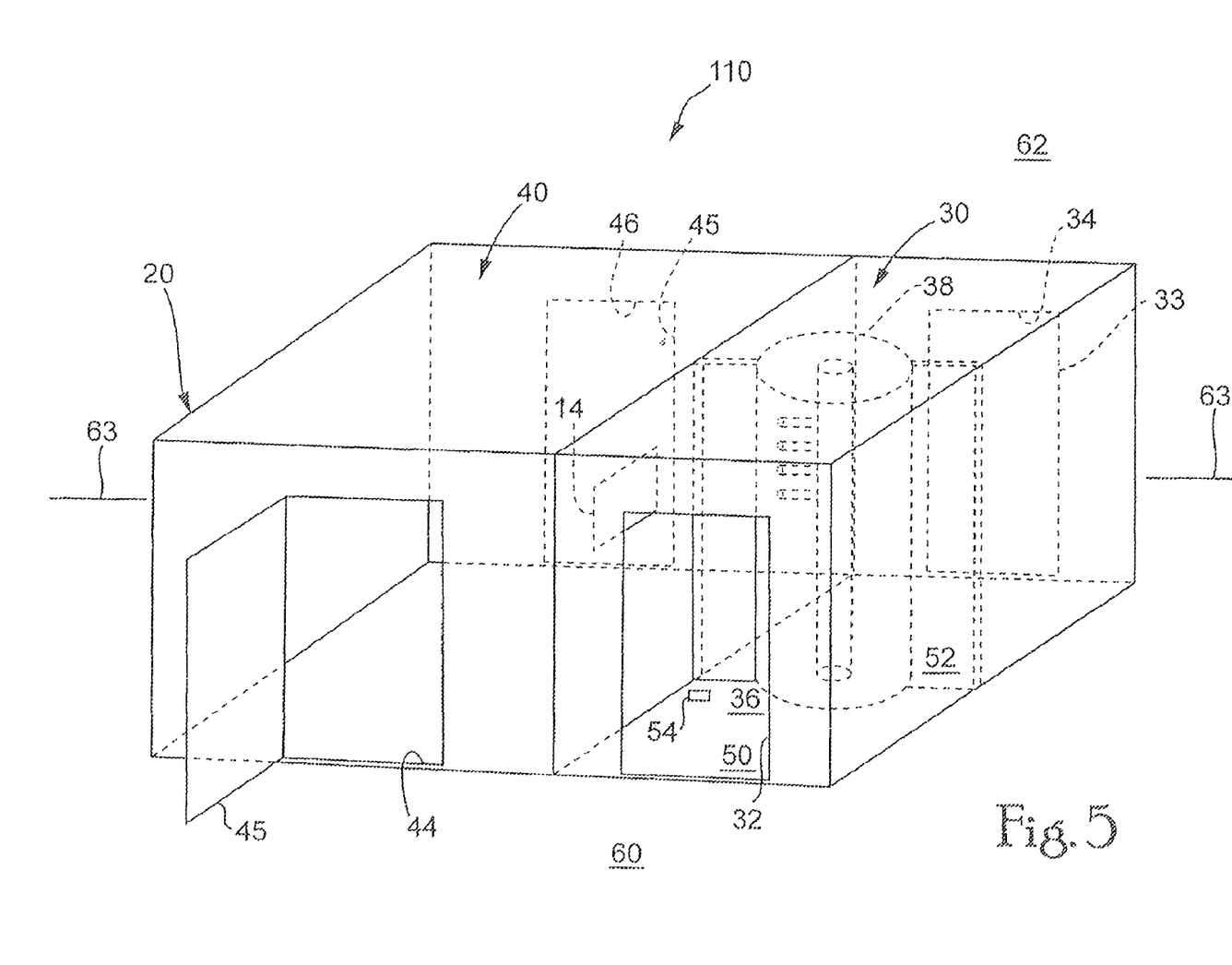
FIG. 5 illustrates a perspective view of a passing room 30 and a control room 40, according to one embodiment of the invention.

FIG. 5 illustrates a perspective view of a passing room 30 and a control room 40, according to one embodiment of the invention. As the portable container 110 has a housing 20 which comprises both the at least one passing room 30 and the at least one control room 40, it is easy for users to move and use almost anywhere. The portable container has everything that a user needs to control access to an area.

Use of the Containerized Access Control Unit

The portable container 110 can be put on a vehicle or trailer and transported or towed to reach multiple destinations, and can be used to control access to an area. The portable container may be used by people who have an access device (e.g., people working on a construction site). The access device is read by the security device. The portable container 110 may also be used by people that do not have an access device, but who must pass through security to enter a venue (e.g., an outside concert).

Use with Access Device. If the portable container 110 is being used in conjunction with an access device, when a person approaches the passing room 30 from an area 60 and enters the first opening 32, the person can stay in the first space 50 in the walkway 36 and present an access device (e.g., identification or electronically read card) to the security device 54. In one embodiment, because the security device 54 is located inside the passing room, the chance that the person will lose or break an identification card or device is decreased because the person does not need to expose the identification card or device outside of the portable container 110. The portable container 110 also protects the security device 54, because the security device 54 is located inside of the passing room 30.

In one embodiment, the barrier device remains locked or closed until the access device is successfully read by the security device 54. Once a person is approved by the security device 54, the barrier device 38 is unlocked and the person can go through the barrier device 38. If a person is not approved by the security device 54, the barrier device 38 continues to be kept locked, and, the control panel 42 can give an alarm to a guard via the alarm device 43.

Use without Access Device. If the portable container 110 is being used without an access device, when a person approaches the passing room 30 from an area 60 and enters the first opening 32, the person can stay in the first space 50 in the walkway 36 and go through the security device 54 (e.g., a metal detector). In one embodiment, the barrier device 38 can be the same device as the security device 54 (e.g., the metal detector). In another embodiment, a separate barrier device can be used to stop persons from accessing the secured area 62. The barrier device 38 remains locked or closed until the security device 54 or security personnel authorizes a person to enter the secured area 62. Once a person is approved, the barrier device 38 is unlocked and the person can go through the barrier device 38. If a person is not approved, the barrier device 38 continues to be kept locked, and, the control panel 42 can give an alarm to a guard via the alarm device 43. Alternatively, the barrier device can remain open until locked by security personnel, for example.

Manufacturing of the Containerized Access Control Unit

In one embodiment, a standard shipping container is filled with material to be shipped at a first location. Then, the container is shipped to a second location. The container is next unloaded at the second location. Next, the container is outfitted as an access control unit after the container is unloaded. In one embodiment, the second location can be overseas from the first embodiment.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

In addition, it should be understood that the figures, which highlight the functionality and advantages of the present invention, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:
1. An access control system, comprising:
a rectangular portable container without wheels, having a lockable accessible door on at least one side of the container, and comprised of a steel frame and durable material enabling the portable container to withstand repeated lifting, placing and towing, wherein all access into or from the portable container consists only of openings associated with lockable or closable access between a first area on one side of the portable container and a second area on a second side of the portable container, such that no additional openings in the portable container exist through which a person may gain unauthorized access from the first area into the second area;
at least one passing room disposed in the container, the at least one passing room having at least a first passing room opening, and at least a second passing room opening, and a walkway in-between;
at least one barrier device located in the passing room, defining a first space between the first passing room opening and the at least one barrier device, and a second space between the at least one barrier device and the second passing room opening; and
at least one electronic control coupled to the at least one barrier device and configured and arranged to selectively cause the at least one barrier device to permit or block passage through the at least one barrier device;
wherein the at least one electronic control and the at least one barrier device are configured to permit or block passage through the passing room to thereby prevent unauthorized access from the first area into the second area.

2. The access control system of claim 1, wherein the at least one electronic control is capable of providing authorization for a person to pass through the at least one barrier device.

3. The access control system of claim 2, wherein the at least one electronic control includes one or more card readers, one or more metal detectors, one or more biometric readers, one or more iris scanners, one or more fingerprint readers, one or more facial recognition technology, one or more explosive detectors, one or more electronic key locks, or one or more mechanical key locks, or a combination of two or more thereof.

4. The access control system of claim 2, wherein the at least one electronic control is located outside the at least one passing room.

5. The access control system of claim 1, further comprising enclosing material to separate the first area adjacent the at least a first passing room opening from the second area adjacent the at least a second passing room opening, the container being disposed adjacent to the enclosing material.

6. The access control system of claim 5, wherein the wall includes at least one window.

7. The access control system of claim 1, wherein the container is delivered in a turnkey state.

8. The access control system of claim 1, wherein the at least one passing room provides a substantially linear path from the first passing room opening to the second passing room opening.

9. An access control system, comprising:
a rectangular portable container without wheels, having a lockable accessible door on at least one side of the container, and comprised of a steel frame and durable material enabling the portable container to withstand repeated lifting, placing and towing, wherein all access into or from the portable container consists only of openings associated with lockable or closable access between a first area on one side of the portable container and a second area on a second side of the portable container, such that no additional openings in the portable container exist through which a person may gain unauthorized access from the first area into the second area;
at least one passing room disposed in the container, the at least one passing room having at least a first passing room opening, at least a second passing room opening, and a walkway in-between;
at least one barrier device located in the passing room;
at least one electronic control coupled to the at least one barrier device and configured and arranged to selectively enable or prevent passage through the at least one barrier device; and
at least one control area disposed in the container adjacent to the at least one passing room, with at least a first control room opening, the at least one control area having the at least one electronic control disposed therein for controlling the at least one barrier device to enable or prevent passage through the at least one barrier device, wherein a wall is disposed between the at least one control area and the at least one passing room.

10. The access control system of claim 9, wherein the at least one electronic control is capable of providing authorization for a person to pass through the at least one barrier device.

11. The access control system of claim 10, wherein the at least one electronic control includes one or more card readers, one or more metal detectors, one or more biometric readers, one or more iris scanners, one or more fingerprint readers, one or more facial recognition technology, one or more explosive detectors, one or more electronic key locks, or one or more mechanical key locks, or a combination of two or more thereof.

12. The access control system of claim 10, wherein the at least one electronic control is located outside the at least one passing room.

13. The access control system of claim 9, further comprising enclosing material to separate the first area adjacent the at least a first passing room opening from the second area adjacent the at least a second passing room opening, the container being disposed adjacent to the enclosing material.

14. The access control system of claim 9, wherein the at least one control area comprises at least one control panel.

15. The access control system of claim 14, wherein the at least one control panel controls the at least one electronic control to enable a person to monitor the at least one passing room from the at least one control area.

16. The access control system of claim 9, wherein the container is delivered in a turnkey state.

17. The access control system of claim 9, wherein the at least one passing room provides a substantially linear path from the first passing room opening to the second passing room opening.

18. An access control system, comprising:
a rectangular portable shipping container which, prior to any modifications to create the access control system, has dimensions of length, width and height that comply with standard shipping container dimensions determined by the International Organization for Standardization (ISO), wherein the shipping container is comprised of a steel frame and durable material enabling the container to withstand repeated lifting, placing and towing, wherein all access into or from the portable container consists only of openings associated with lockable or closable access between a first area on one side of the portable container and a second area on a second side of the portable container, such that no additional openings in the portable container exist through which a person may gain unauthorized access from the first area into the second area; and
at least one passing room disposed in the portable container, the at least one passing room having at least a first passing room opening, and at least a second passing room opening, and a walkway in-between;
at least one barrier device located in the passing room, defining a first space between the first passing room opening and the at least one barrier device, and a second space between the at least one barrier device and the second passing room opening; and
at least one electronic control configured to enable or deny passage of a person through the passing room from the first area into the second area.

19. The access control system of claim 18, wherein the at least one electronic control is capable of providing authorization for a person to pass through the at least one barrier device.

20. The access control system of claim 19, wherein the at least one electronic control includes one or more card readers, one or more metal detectors, one or more biometric readers, one or more iris scanners, one or more fingerprint readers, one or more facial recognition technology, one or more explosive detectors, one or more electronic key locks, or one or more mechanical key locks, or a combination of two or more thereof.

21. The access control system of claim 19, wherein the at least one electronic control is located outside the at least one passing room.

22. The access control system of claim 18, further comprising enclosing material to separate the first area adjacent the at least a first passing room opening from the second area adjacent the at least a second passing room opening, the container being disposed adjacent to the enclosing material.

23. The access control system of claim 18, wherein the container is delivered in a turnkey state.

24. The access control system of claim 18, wherein the at least one passing room provides a substantially linear path from the first passing room opening to the second passing room opening.

25. A method of controlling passage, comprising:
providing an access control unit to control access to an area, the access control unit including:
a rectangular portable container without wheels, having a lockable accessible door on at least one side of the container, and comprised of a steel frame and durable material enabling the container to withstand repeated lifting, placing and towing, wherein all access into or from the portable container consists only of openings associated with lockable or closable access between a first area on one side of the portable container and a second area on a second side of the portable container, such that no additional openings in the portable container exist through which a person may gain unauthorized access from the first area into the second area;
at least one passing room disposed in the portable container, the at least one passing room having at least a first passing room opening, and at least a second passing room opening, and a walkway in-between;
at least one turnstile located in the walkway defining a first space between the first passing room opening and the at least one turnstile, and a second space between the at least one turnstile and the second passing room opening; and
at least one electronic control in communication with the at least one turnstile, wherein the first area is further characterized as being adjacent the first passing room opening and the second area is further characterized as being adjacent the second passing room opening such that ingress to the second area is controlled by the access control unit and the at least one electronic control is configured to control the at least one turnstile to permit or block passage through the passing room into the second area;
monitoring persons who are desiring to pass through the portable container, wherein the monitoring includes utilizing the at least one electronic control to verify identity of a person in the first area and issuing a permission for the at least one electronic control to enable the person to pass through the passing room into the second area and
selectively enabling passage through the at least one barrier device, based on the monitoring.

26. The method of claim 25, wherein the first opening and the second opening of the container are located on opposite sides of an enclosing material.

27. The method of claim 25, further comprising controlling ingress and egress between a first area adjacent the at least a first opening and a second area adjacent the at least a second opening via at least one control area disposed in the container adjacent to the at least one passing room.

28. The method of claim 27, wherein the controlling comprises authorizing entry of a person into the second area.

29. The method of claim 27, wherein the controlling comprises monitoring the at least one passing room.

30. The method of claim 27, wherein the controlling comprises controlling the at least one barrier device so as to authorize or deny passage therethrough.

31. The method of claim 25, wherein a substantially linear walkway is provided between the at least first opening and the at least second opening.

32. An access system, comprising:
a rectangular portable structure without wheels, having a lockable accessible door on at least one side of the portable structure, and comprised of a steel frame and durable material enabling the portable structure to withstand repeated lifting, placing and towing, wherein all access into or from the portable structure consists only of openings associated with lockable or closable access between a first area on one side of the portable structure and a second area on a second side of the portable structure, such that no additional openings in the portable structure exist through which a person may gain unauthorized access from the first area into the second area;
at least one passing area in the structure, the at least one passing area having at least a first opening, and at least a second opening, and a pathway;
at least one turnstile in the pathway, defining a first space between the first opening and the at least one turnstile, and a second space between the at least one turnstile and the second opening; and
at least one security device coupled to the at least one turnstile and configurable to control passage through the at least one turnstile from the first area into the second area.

33. An access control system, comprising:
a rectangular portable structure without wheels, having a lockable accessible door on at least one side of the structure, and comprised of a steel frame and durable material enabling the portable structure to withstand repeated lifting, placing and towing, wherein all access into or from the portable structure consists only of openings associated with lockable or closable access between a first area on one side of the portable structure and a second area on a second side of the portable structure, such that no additional openings in the portable structure exist through which a person may gain unauthorized access from the first area into the second area;
at least one passing area disposed in the structure, the at least one passing area having at least a first passing area opening, at least a second passing area opening, and a pathway;
at least one turnstile;
at least one security device coupled to the at least one turnstile and configured and arranged to control passage through the at least one turnstile from the first area into the second area; and
at least one control area disposed in the structure adjacent to the at least one passing area, with at least a first control area opening, the at least one control area having at least one security device disposed therein capable of controlling passage through the at least one turnstile,
wherein a barrier is disposed between the at least one control room and the at least one passing area.

34. An access control system, comprising:
a rectangular shipping container which, prior to any modifications to create the access control system, has dimensions of length, width and height that comply with standard shipping container dimensions determined by the International Organization for Standarization (ISO), wherein the container is comprised of a steel frame and durable material enabling the container to withstand repeated lifting, placing and towing, wherein all access into or from the container consists only of openings associated with lockable or closable access between a first area on one side of the container and a second area on a second side of the container, such that no additional openings in the container exist through which a person may gain unauthorized access from the first area into the second area; and at least one passing area disposed in the container, the at least one passing area having at least a first passing area opening, and at least a second passing area opening, and a pathway; and at least one turnstile located in the pathway, defining a first space between the first passing area opening and the at least one turnstile, and a second space between the at least one turnstile and the second passing area opening;

a security device configured to enable or deny passage of a person through the passing room from the first area into the second area.

35. A method of controlling passage, comprising:
monitoring persons who are desiring to pass through a portable structure, the structure including:
a rectangular portable container without wheels, having a lockable accessible door on at least one side of the container, and comprised of a steel frame and durable material enabling the portable container to withstand repeated lifting, placing and towing, wherein all access into or from the portable container consists only of openings associated with lockable or closable access between a first area on one side of the portable container and a second area on a second side of the portable container, such that no additional openings in the portable container exist through which a person may gain unauthorized access from the first area into the second area at least one passing area, the at least one passing area having at least a first opening and at least a second opening and a pathway, and at least one turnstile located in the pathway, defining a first space between the first opening and the at least one turnstile, and a second space between the at least one turnstile and the second opening; and selectively enabling passage through the at least one turnstile from the first area to the second area, based on the monitoring.

36. A method of construction access control system, comprising:
obtaining a rectangular portable container;
customizing the portable container to meet specific needs of a user, including:
creating first and second openings in the container;
creating a passing room connected to the first and second openings;
disposing at least one barrier device in the passing room such that a first space is disposed between the first opening and the at least one barrier device and a second space is disposed between the at least one barrier device and the second opening; and
installing at least one electronic control in the container to selectively cause the at least one barrier device to permit or block passage through the at least one barrier device;
wherein a customized access control system is created, with the portable container comprised of a steel frame and durable material enabling the portable container to withstand repeated lifting, placing and towing, wherein all access into or from the portable container consists only of openings associated with lockable or closable access between a first area on one side of the portable container and a second area on a second side of the portable container, such that no additional openings in the portable container exist through which a person may gain unauthorized access from the first area into the second area; and
providing the customized access control system for delivery in a turnkey state.

* * * * *